United States Patent
Williams

(10) Patent No.: US 12,081,713 B2
(45) Date of Patent: Sep. 3, 2024

(54) METHODS AND SYSTEMS FOR MAINTAINING A TIME MEASUREMENT ON AN ELECTRONIC DEVICE

(71) Applicant: Lexmark International, Inc., Lexington, KY (US)

(72) Inventor: Jennifer Topmiller Williams, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 18/196,166

(22) Filed: May 11, 2023

(65) Prior Publication Data

US 2023/0283729 A1  Sep. 7, 2023

Related U.S. Application Data

(63) Continuation of application No. 17/727,743, filed on Apr. 23, 2022, now Pat. No. 11,665,298.

(60) Provisional application No. 63/256,618, filed on Oct. 17, 2021.

(51) Int. Cl.
*G06F 3/12* (2006.01)
*H04N 1/00* (2006.01)
*H04N 1/44* (2006.01)

(52) U.S. Cl.
CPC ..... *H04N 1/00962* (2013.01); *H04N 1/00039* (2013.01); *H04N 1/00087* (2013.01); *H04N 1/00856* (2013.01); *H04N 1/4433* (2013.01)

(58) Field of Classification Search
CPC ........... H04N 1/00962; H04N 1/00039; H04N 1/00087; H04N 1/00856; H04N 1/4433
See application file for complete search history.

(56) References Cited

U.S. PATENT DOCUMENTS

2005/0206694 A1* 9/2005 Wadley ................ B41J 2/17543
347/85

* cited by examiner

*Primary Examiner* — Moustapha Diaby

(57) ABSTRACT

An imaging device supply item comprising a memory, the memory storing a supply item manufacturing time stamp. The supply item is configured to send the supply item manufacturing time stamp to an imaging device. A method performed by an imaging device supply item, the method comprising: storing a supply item manufacturing time stamp on a memory of the supply item, and sending the supply item manufacturing time stamp to an imaging device. An imaging device comprising: a memory, the memory storing a time measurement, wherein the imaging device is configured to maintain the time measurement by: updating the time measurement of the imaging device, based on a supply item manufacturing time stamp indicative of a manufacturing time of a supply item installed in the imaging device.

13 Claims, 2 Drawing Sheets

METHODS AND SYSTEMS FOR MAINTAINING A TIME MEASUREMENT ON AN ELECTRONIC DEVICE

CROSS REFERENCE TO RELATED APPLICATIONS

This application claims priority to U.S. patent application Ser. No. 17/727,743, filed Apr. 23, 2022 entitled "Methods and Systems for Maintaining a Time Measurement on an Electronic Device", which claims priority to U.S. Provisional Application Ser. No. 63/256,618, filed Oct. 17, 2021, entitled "Update Printer Uptime using Consumable Manufacturing Time", the content of which is hereby incorporated by reference in its entirety.

BACKGROUND

1. Technical Field

The present disclosure generally relates to methods and systems for maintaining a time measurement on an electronic device, and, more particularly, methods and systems for maintaining a time measurement on an imaging device.

2. Description of the Related Art

In electronic systems, it is often desirable to confirm the authenticity of a component of the electronic system to ensure that the entire system operates as designed. Non-authentic components employ various techniques to mimic the behavior of authentic components. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

It is often desirable to change the behavior of an electronic system during its lifecycle, by making changes to software or firmware. In this way, functionality and/or authentication criteria for components may be changed or added. For example, changes in imaging device functionality may include deployment of latent firmware functions (e.g., countermeasures, or additional security authentication with supply security devices), or updates to compatibility settings that govern which supplies may be installed in the imaging device.

Methods for accomplishing these changes outside of user-implemented firmware updates often use timer-based mechanisms, wherein the electronic device contains a tamper-resistant clock that records the total elapsed uptime since a reference date/time. The electronic system's firmware monitors this clock value and deploys functions at certain times, typically based on a table of stored trigger values. However, a key disadvantage of this method is that the timer can become significantly behind the true time. This may occur due to tampering in which the timer is rolled backward in order to disable previously enabled functions altogether. Alternatively, the device may have been powered off for a long period of time, meaning that the timer has not been advanced.

In order to rotate keys and enable dormant functionality at a proper cadence, it is desirable to be able to safely and securely update the timer. One method to update the timer is through a user-implemented firmware update, but firmware updates by the end user will generally not be performed to an acceptable extent. Another method to securely update the uptime would be beneficial to ensure changing functionality occurs at the proper frequency.

Accordingly, there is a need for improved systems and methods for updating timers in electronic devices.

SUMMARY

The present disclosure provides example methods and systems that may be implemented in any general electronic system or specifically in an imaging/printing device/system to thwart the use of non-authentic components.

There is provided a method of maintaining a time measurement stored on an imaging device, the method comprising: receiving, by the imaging device, a supply item manufacturing time stamp from a supply item connected to the imaging device, comparing the supply item manufacturing time stamp with the time measurement of the imaging device, and updating, by the imaging device, the time measurement of the imaging device, based on the supply item manufacturing time stamp.

In certain implementations, the time measurement may be indicative of a real-world time and date. For example, the time measurement may be indicative of a number of seconds elapsed after a reference time and date. The imaging device may increment the time measurement at regular intervals, by an amount equivalent to the regular interval when the imaging device is powered on. The time measurement may be incremented from an initial time measurement set to be indicative of the time and date of manufacture of the imaging device. The time measurement may persist across power cycles of the imaging device.

In certain implementations, the time measurement is stored in non-volatile memory. The regular interval may be selected to require less writes than a maximum number of writes for the non-volatile memory over a predicted lifetime of the imaging device.

In certain implementations, during manufacturing, the initial time measurement value is written to non-volatile memory on the imaging device. In certain implementations, during operation of the imaging device, the time measurement is stored at regular time intervals. In certain implementations, each time the imaging device begins operation, it reads the current time measurement from non-volatile memory and stores it locally. The local value is incremented by 1 for each second that passes. After the regular interval has passed, the time measurement in non-volatile memory is overwritten with the local value.

In certain implementations, updating the time measurement occurs when the time measurement of the imaging device is indicative of an earlier time than the supply item manufacturing time stamp. In certain implementations, the supply item manufacturing time stamp is indicative of the time and date at which the supply item was manufactured.

In certain implementations, the supply item manufacturing time stamp is stored in a signed certificate, for example a device unique signed certificate. In certain implementations, the method further comprises verifying the signed certificate. The step of verifying may occur before updating the time measurement of the imaging device based on the supply item manufacturing time stamp and/or before reading the supply item manufacturing time stamp from the signed certificate.

In certain implementations, comparing the supply item manufacturing time stamp with the time measurement of the imaging device is performed by the imaging device.

In certain implementations, the method further comprises: sending, by the imaging device, the time measurement to the supply item, comparing, by the supply item, the supply item manufacturing time stamp with the time measurement of the imaging device, sending, by the supply item, the supply item manufacturing time stamp to the imaging device, and updating, by the imaging device, the imaging device time measurement, based on the supply item manufacturing time stamp. In certain implementations, the supply item sends the supply item manufacturing time stamp when the time measurement of the imaging device indicates an earlier time than the supply item manufacturing time stamp.

In certain implementations, updating the time measurement of the imaging device comprises updating the time measurement of the imaging device to equal the supply item manufacturing time stamp.

There is further provided, a method of updating an imaging device, the method comprising: maintaining a time measurement of the imaging device according to a method described above, and updating the imaging device based on the time measurement.

In certain implementations, updating the imaging device comprises changing functionality of the imaging device. In certain implementations, the imaging device is configured to activate/deactivate and/or perform one or more specified functions at respective specified times. When the time measurement is updated, functions which are set to be activated/deactivated and/or performed before the updated time measurement are activated/deactivated and/or performed.

In certain implementations, the functionality is a security function. In certain implementations, changing the functionality comprises activating the security function. In certain implementations, updating the imaging device comprises changing a security key of the imaging device. In certain implementations, changing the security key comprises selecting a new security key from a plurality of stored security keys on the imaging device.

In certain implementations, the method further comprises sending the time measurement of the imaging device to the supply item. In certain implementations, the method further comprises updating the supply item based on the time measurement.

There is further provided, a method of updating an imaging system the method comprising: updating an imaging device of the imaging system as described above, and sending the time measurement of the imaging device to the supply item of the imaging system, and updating the supply item, based on the time measurement. In certain implementations, updating the supply item comprises changing functionality of the supply item. In certain implementations, the supply item is configured to activate/deactivate and/or perform one or more specified functions at respective specified times. When the time measurement is updated, functions which are set to be activated/deactivated and/or performed before the updated time measurement are activated/deactivated and/or performed.

In certain implementations, the functionality is a security function. In certain implementations, changing the functionality comprises activating the security function. In certain implementations, updating the supply item comprises changing a security key of the supply item. In certain implementations, changing the security key comprises selecting a new security key from a plurality of stored security keys on the supply item. In certain implementations, the supply item is updated in a corresponding way to the imaging device. This allows the changes to occur without any direct communication between the devices specifying a change at that moment, which obfuscates that a change has occurred.

There is further provided, an imaging device, the imaging device comprising a memory, the memory storing a time measurement, wherein the imaging device is configured to maintain the time measurement by: receiving a supply item manufacturing time stamp from a supply item connected to the imaging device, and updating the time measurement of the imaging device, based on the supply item manufacturing time stamp.

In certain implementations, the time measurement is stored in non-volatile memory.

In certain implementations, the imaging device is configured to update the time measurement of the imaging device, when the time measurement of the imaging device is indicative of an earlier time than the supply item manufacturing time stamp.

In certain implementations, the imaging device is further configured to compare the received supply item manufacturing time stamp with the time measurement to determine if the time measurement of the imaging device is indicative of an earlier time than the supply item manufacturing time stamp.

In certain implementations, the imaging device is further configured to update the time measurement of the imaging device to equal the supply item manufacturing time stamp. In certain implementations, the imaging device is configured to prevent the time measurement from being updated to indicate an earlier time.

In certain implementations, the imaging device is further configured to update the imaging device based on the maintained time measurement. In certain implementations, updating the imaging device comprises changing functionality of the imaging device. In certain implementations, the functionality is a security function and changing the functionality comprises activating the security function.

In certain implementations, the imaging device is configured to carry out a method as described above.

There is further provided an imaging device supply item, the supply item comprising a memory, the memory storing a supply item manufacturing time stamp, and the supply item being configured to send the supply item manufacturing time stamp to an imaging device. In certain implementations, the supply item is configured to send the supply item manufacturing time stamp to the imaging device when the supply item receives a corresponding request from the imaging device, and/or when the supply item is first connected to the imaging device, and/or when a time measurement of the imaging device indicates an earlier time than the supply item manufacturing time stamp.

In certain implementations, the supply item is further configured to compare the supply item manufacturing time stamp with the time measurement of the imaging device, and, when the time measurement of the imaging device is earlier than the supply item manufacturing time stamp, to send the supply item manufacturing time stamp to the imaging device.

In certain implementations, the supply item is configured to update itself, based on the time measurement. In certain implementations, updating the supply item comprises changing functionality of the supply item. In certain implementations, the supply item is configured to activate/deactivate and/or perform one or more specified functions at respective specified times. When the time measurement is updated, functions which are set to be activated/deactivated and/or performed before the updated time measurement are activated/deactivated and/or performed.

In certain implementations, the functionality is a security function. In certain implementations, changing the functionality comprises activating the security function. In certain implementations, updating the supply item comprises changing a security key of the supply item. In certain implementations, changing the security key comprises selecting a new security key from a plurality of stored security keys on the supply item. In certain implementations, the supply item is updated in a corresponding way to the imaging device. This allows the changes to occur without any direct communication between the devices specifying a change at that moment, which obfuscates that a change has occurred.

There is further provided an imaging system comprising an imaging device as described above and a supply item as described above.

There is provided a method of maintaining a time measurement stored on an electronic device, the method comprising: receiving, by the electronic device, a supply item manufacturing time stamp from a supply item connected to the electronic device, comparing the supply item manufacturing time stamp with the time measurement of the electronic device, and updating, by the electronic device, the time measurement of the electronic device, based on the supply item manufacturing time stamp.

In certain implementations, the time measurement may be indicative of a real-world time and date. For example, the time measurement may be indicative of a number of seconds elapsed after a reference time and date. The electronic device may increment the time measurement at regular intervals, by an amount equivalent to the regular interval when the electronic device is powered on. The time measurement may be incremented from an initial time measurement set to be indicative of the time and date of manufacture of the electronic device. The time measurement may persist across power cycles of the electronic device.

In certain implementations, the time measurement is stored in non-volatile memory. The regular interval may be selected to require less writes than a maximum number of writes for the non-volatile memory over a predicted lifetime of the electronic device.

In certain implementations, during manufacturing, the initial time measurement value is written to non-volatile memory on the electronic device. In certain implementations, during operation of the electronic device, the time measurement is stored at regular time intervals. In certain implementations, each time the electronic device begins operation, it reads the current time measurement from non-volatile memory and stores it locally. The local value is incremented by 1 for each second that passes. After the regular interval has passed, the time measurement in non-volatile memory is overwritten with the local value.

In certain implementations, updating the time measurement occurs when the time measurement of the electronic device is indicative of an earlier time than the supply item manufacturing time stamp. In certain implementations, the supply item manufacturing time stamp is indicative of the time and date at which the supply item was manufactured.

In certain implementations, the supply item manufacturing time stamp is stored in a signed certificate, for example a device unique signed certificate. In certain implementations, the method further comprises verifying the signed certificate. The step of verifying may occur before updating the time measurement of the electronic device based on the supply item manufacturing time stamp and/or before reading the supply item manufacturing time stamp from the signed certificate.

In certain implementations, comparing the supply item manufacturing time stamp with the time measurement of the electronic device is performed by the electronic device.

In certain implementations, the method further comprises: sending, by the electronic device, the time measurement to the supply item, comparing, by the supply item, the supply item manufacturing time stamp with the time measurement of the electronic device, sending, by the supply item, the supply item manufacturing time stamp to the electronic device, and updating, by the electronic device, the electronic device time measurement, based on the supply item manufacturing time stamp. In certain implementations, the supply item sends the supply item manufacturing time stamp when the time measurement of the electronic device indicates an earlier time than the supply item manufacturing time stamp.

In certain implementations, updating the time measurement of the electronic device comprises updating the time measurement of the electronic device to equal the supply item manufacturing time stamp.

There is further provided, a method of updating an electronic device, the method comprising: maintaining a time measurement of the electronic device according to a method described above, and updating the electronic device based on the time measurement.

In certain implementations, updating the electronic device comprises changing functionality of the electronic device. In certain implementations, the electronic device is configured to activate/deactivate and/or perform one or more specified functions at respective specified times. When the time measurement is updated, functions which are set to be activated/deactivated and/or performed before the updated time measurement are activated/deactivated and/or performed.

In certain implementations, the functionality is a security function. In certain implementations, changing the functionality comprises activating the security function. In certain implementations, updating the electronic device comprises changing a security key of the electronic device. In certain implementations, changing the security key comprises selecting a new security key from a plurality of stored security keys on the electronic device.

In certain implementations, the method further comprises sending the time measurement of the electronic device to the supply item. In certain implementations, the method further comprises updating the supply item based on the time measurement.

There is further provided, a method of updating an electronic system the method comprising: updating an electronic device of the electronic system as described above, and sending the time measurement of the electronic device to the supply item of the electronic system, and updating the supply item, based on the time measurement. In certain implementations, updating the supply item comprises changing functionality of the supply item. In certain implementations, the supply item is configured to activate/deactivate and/or perform one or more specified functions at respective specified times. When the time measurement is updated, functions which are set to be activated/deactivated and/or performed before the updated time measurement are activated/deactivated and/or performed.

In certain implementations, the functionality is a security function. In certain implementations, changing the functionality comprises activating the security function. In certain implementations, updating the supply item comprises changing a security key of the supply item. In certain implementations, changing the security key comprises selecting a new security key from a plurality of stored security keys on the supply item. In certain implementations, the supply item is updated in a corresponding way to the electronic device. This allows the changes to occur without any direct communication between the devices specifying a change at that moment, which obfuscates that a change has occurred.

There is further provided, an electronic device, the electronic device comprising a memory, the memory storing a time measurement, wherein the electronic device is configured to maintain the time measurement by: receiving a supply item manufacturing time stamp from a supply item connected to the electronic device, and updating the time measurement of the electronic device, based on the supply item manufacturing time stamp.

In certain implementations, the time measurement is stored in non-volatile memory.

In certain implementations, the electronic device is configured to update the time measurement of the electronic device, when the time measurement of the electronic device is indicative of an earlier time than the supply item manufacturing time stamp.

In certain implementations, the electronic device is further configured to compare the received supply item manufacturing time stamp with the time measurement to determine if the time measurement of the electronic device is indicative of an earlier time than the supply item manufacturing time stamp.

In certain implementations, the electronic device is further configured to update the time measurement of the electronic device to equal the supply item manufacturing time stamp. In certain implementations, the electronic device is configured to prevent the time measurement from being updated to indicate an earlier time.

In certain implementations, the electronic device is further configured to update the electronic device based on the maintained time measurement. In certain implementations, updating the electronic device comprises changing functionality of the electronic device. In certain implementations, the functionality is a security function and changing the functionality comprises activating the security function.

In certain implementations, the electronic device is configured to carry out a method as described above.

There is further provided an electronic device supply item, the supply item comprising a memory, the memory storing a supply item manufacturing time stamp, and the supply item being configured to send the supply item manufacturing time stamp to an electronic device. In certain implementations, the supply item is configured to send the supply item manufacturing time stamp to the electronic device when the supply item receives a corresponding request from the electronic device, and/or when the supply item is first connected to the electronic device, and/or when a time measurement of the electronic device indicates an earlier time than the supply item manufacturing time stamp.

In certain implementations, the supply item is further configured to compare the supply item manufacturing time stamp with the time measurement of the electronic device, and, when the time measurement of the electronic device is earlier than the supply item manufacturing time stamp, to send the supply item manufacturing time stamp to the electronic device.

There is further provided an electronic system comprising an electronic device as described above and a supply item as described above.

In any of the implementations/embodiments described herein, the components may be connected via any shared bus, such as I2C or peer-to-peer.

The methods, devices, supply items and systems described above may be employed in any combination. The optional features described above are equally applicable to all of the described methods, devices, supply items and systems and are not limited to the particular method/device/supply item/system with which they are described. The essential features of any of the methods, devices, supply items and systems described may be optional features of any other methods, devices, supply items and systems described.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

As used herein, the term 'leader' is equivalent to the term 'master' and can be used interchangeably throughout without changing the meaning. As used herein, the term 'follower' is equivalent to the term 'slave' and can be used interchangeably throughout without changing the meaning. Both terms 'master' and 'slave' take their usual meanings in the art, for example, as used in the official I2C specification.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

DETAILED DESCRIPTION OF THE DRAWINGS

Figure 1:
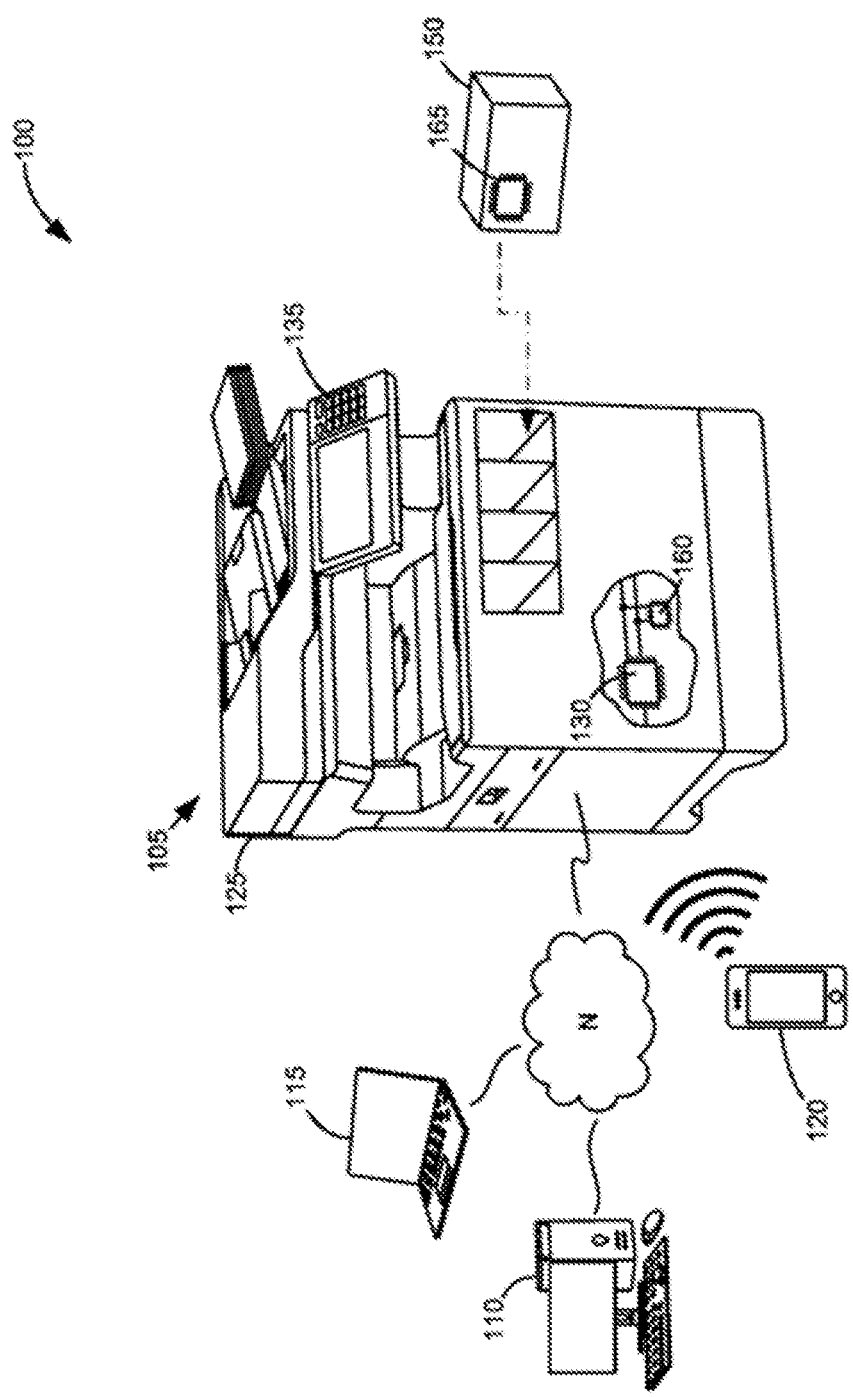
FIG. 1 is a diagrammatic view of an imaging system.

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

It will be further understood that each block of the flow chart, and combinations of blocks in the flow chart, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the flow chart discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the flow chart support combinations of means for performing the specified functions, combinations of steps for performing the specified functions and program instruction means for performing the specified functions. It will also be understood that each block of the flow chart, and combinations of blocks in the flow chart, can be implemented by special purpose hardware-based computer systems that perform the specified functions or steps or combinations of special purpose hardware and computer instructions.

Disclosed are example systems and methods for updating a time measurement in an electronic system, such as an imaging/printer system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device component 130 and a user interface 135. Imaging device component 130 may include a processor and associated memory. In some examples, imaging device component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device component 130 may control the processing of print data. Optionally, imaging device component 130 may also control the operation of a print engine during printing of an image onto a sheet of media.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device security device 160 incorporated in imaging device 105 and a supply item security device 165 of supply item 150.

Figure 2:
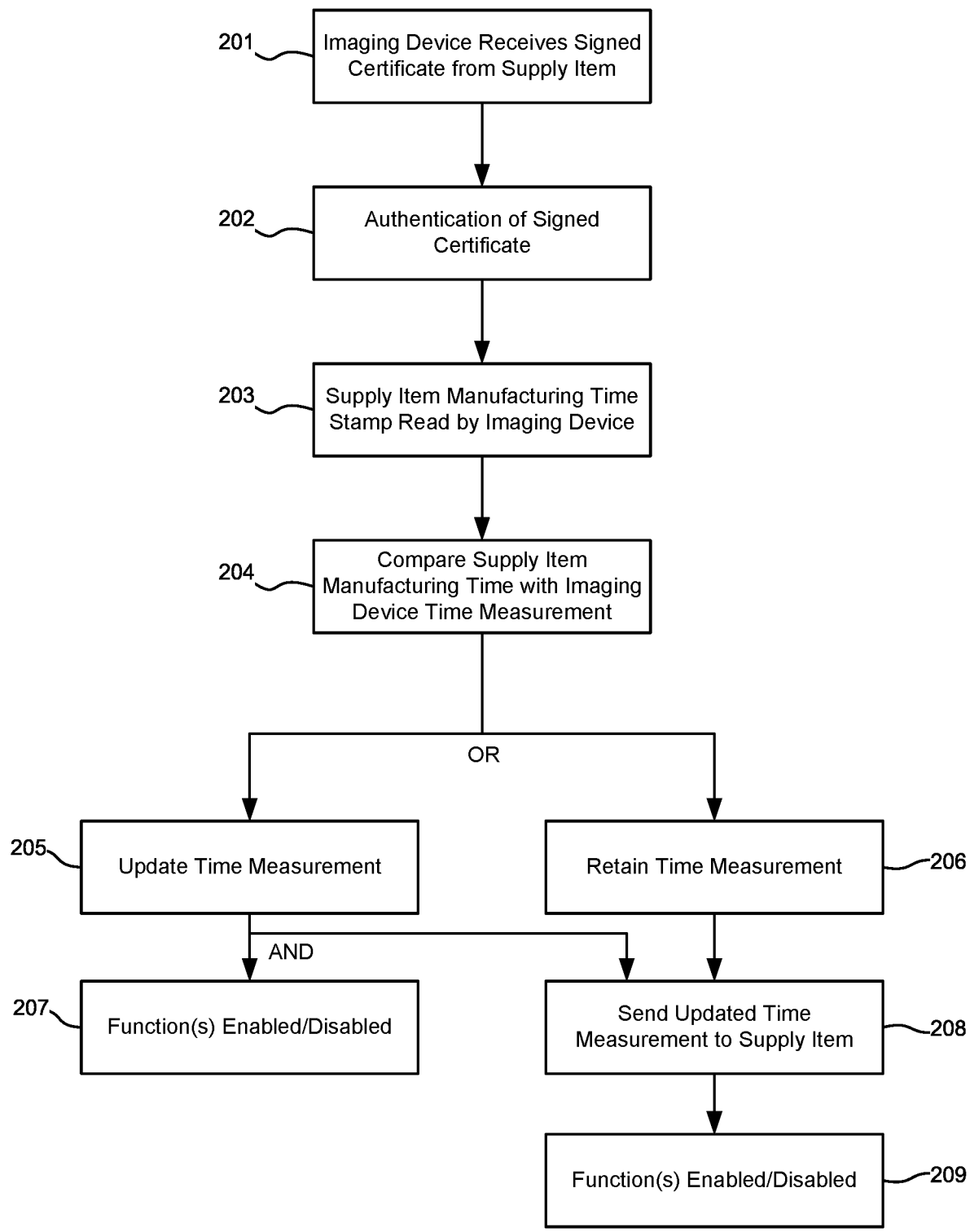
FIG. 2 is a flow chart showing a method of updating an imaging device.

A method of updating the imaging device 105 will now be described with reference to FIG. 2.

The supply item manufacturing time stamp is set as the wall-clock time when a supply item is manufactured and is stored on the consumable in a signed certificate When a supply item 150 is inserted in the imaging device 105, the supply item sends the signed certificate to the imaging device 105 containing the supply item manufacturing time stamp. The signed certificate is received by the imaging device 105 at step 201. It is important that a user cannot advance the imaging device time measurement pre-maturely to get an early look at the new functionality and keys, so the supply item manufacturing time stamp is stored in a device unique signed certificate. Creating a device unique certificate guarantees that an attacker cannot move the signed certificate from one device to another in an attempt to change the time measurement.

The imaging device authenticates the signed certificate at step 202 and reads the supply item manufacturing time stamp at step 203.

At step 204, the supply item manufacturing time stamp is compared with the time measurement of the imaging device 105.

If the supply item manufacturing time stamp indicates a time further in the future than the imaging device time measurement, the imaging device time measurement is advanced to the supply item manufacturing time stamp in step 205. This allows the imaging device to "catch up" to the most current time.

If the supply item manufacturing time stamp is further in the past than the imaging device time measurement, then the imaging device does not change its time measurement in step 206. This helps to prevent a user from using expired keys and functionality.

The firmware within the imaging device and supply item(s) is designed to trigger new functionality or key changes based on a specific time measurement. This means the imaging device needs to share the time measurement with the supply item(s) so that the new functionality or key changes occur at the same moment. This allows the changes to occur without any direct communication between the devices specifying a change at that moment, which obfuscates that a change has occurred.

The imaging device maintains the time measurement and sends it to the supply item before each use and at certain frequencies during operation to ensure that the supply item is synchronized with the imaging device and any timed functionality is enabled/disabled on both the imaging device and supply item simultaneously. This is illustrated in step 208. The imaging device acts as a leader component, with the supply item a follower component regarding the time measurement.

The change in functionality on the imaging device is shown in step 207 and the change in functionality of the supply item is shown in step 209.

In the above implementations/embodiments, the various components are configured as leader/follower components. This is purely optional and other communication busses may be used.

It will be understood that the example applications described herein are illustrative and should not be considered limiting. It will be appreciated that the actions described and shown in the example flowchart may be carried out or performed in any suitable order. It will also be appreciated that not all of the actions described in FIG. 2 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Further disclosure is provided below.

Statement 1: A method of maintaining a time measurement stored on an electronic device, the method comprising: receiving, by the electronic device, a supply item manufacturing time stamp from a supply item connected to the electronic device, comparing the supply item manufacturing time stamp with the time measurement of the electronic device, and updating, by the electronic device, the time measurement of the electronic device, based on the supply item manufacturing time stamp.

Statement 2: The method of statement 1, wherein updating the time measurement occurs when the time measurement of the electronic device is indicative of an earlier time than the supply item manufacturing time stamp Statement 3: The method of statement 1, wherein comparing the supply item manufacturing time stamp with the time measurement of the electronic device is performed by the electronic device.

Statement 4: The method of statement 1, further comprising: sending, by the electronic device, the time measurement to the supply item, comparing, by the supply item, the supply item manufacturing time stamp with the time measurement of the electronic device, sending, by the supply item, the supply item manufacturing time stamp to the electronic device, and updating, by the electronic device, the electronic device time measurement, based on the supply item manufacturing time stamp.

Statement 5: The method of statement 1, wherein updating the time measurement of the electronic device comprises updating the time measurement of the electronic device to equal the supply item manufacturing time stamp.

Statement 6: A method of updating an electronic device, the method comprising: maintaining a time measurement of the electronic device according to the method of claim 1, and updating the electronic device based on the time measurement.

Statement 7: The method of statement 6, wherein updating the electronic device comprises changing functionality of the electronic device.

Statement 8: The method of statement 7, wherein the functionality is a security function and changing the functionality comprises activating the security function.

Statement 9: The method of statement 6, wherein updating the electronic device comprises changing a security key of the electronic device.

Statement 10: The method of statement 6, the method further comprising sending the time measurement of the electronic device to the supply item and updating the supply item based on the time measurement.

Statement 11: An electronic device, the electronic device comprising a memory, the memory storing a time measurement, wherein the electronic device is configured to maintain the time measurement by: receiving a supply item manufacturing time stamp from a supply item connected to the electronic device, and updating the time measurement of the electronic device, based on the supply item manufacturing time stamp.

Statement 12: The electronic device of statement 11, wherein the electronic device is configured to update the time measurement of the electronic device, when the time measurement of the electronic device is indicative of an earlier time than the supply item manufacturing time stamp.

Statement 13: The electronic device of statement 11, wherein the electronic device is further configured to compare the received supply item manufacturing time stamp with the time measurement to determine if the time measurement of the electronic device is indicative of an earlier time than the supply item manufacturing time stamp.

Statement 14: The electronic device of statement 11, wherein the electronic device is further configured to update the time measurement of the electronic device to equal the supply item manufacturing time stamp.

Statement 15: The electronic device of statement 11, wherein the electronic device is further configured to update the electronic device based on the maintained time measurement.

Statement 16: The electronic device of statement 15, wherein updating the electronic device comprises changing functionality of the electronic device.

Statement 17: The electronic device of statement 16, wherein the functionality is a security function and changing the functionality comprises activating the security function.

Statement 18: An electronic device supply item, the supply item comprising a memory, the memory storing a supply item manufacturing time stamp, and the supply item being configured to send the supply item manufacturing time stamp to an electronic device.

Statement 19: The electronic device supply item of statement 18, wherein the supply item is further configured to compare the supply item manufacturing time stamp with the time measurement of the electronic device, and, when the time measurement of the electronic device is earlier than the supply item manufacturing time stamp, to send the supply item manufacturing time stamp to the electronic device.

Statement 20: An electronic system comprising the electronic device of statement 1 and the supply item of statement 18.

What is claimed is:

1. An imaging device supply item, the supply item comprising a memory, the memory storing a supply item manufacturing time stamp, and the supply item being configured to send the supply item manufacturing time stamp to an imaging device, wherein the supply item is configured to update itself, based on the time measurement of the imaging device.

2. The imaging device supply item of claim 1, wherein updating the supply item comprises changing functionality of the supply item.

3. The imaging device supply item of claim 2, wherein the supply item is configured to activate/deactivate and/or perform one or more specified functions at respective specified times, and when the time measurement is updated, specified functions which are set to be activated/deactivated and/or performed before the updated time measurement are activated/deactivated and/or performed.

4. The imaging device supply item of claim 2, wherein the functionality is a security function, and changing the functionality comprises activating the security function.

5. The imaging device supply item of claim 1, wherein updating the supply item comprises changing a security key of the supply item.

6. The imaging device supply item of claim 5, wherein changing the security key comprises selecting a new security key from a plurality of stored security keys on the supply item.

7. A method performed by an imaging device supply item, the method comprising:
   storing a supply item manufacturing time stamp on a memory of the supply item;
sending the supply item manufacturing time stamp to an imaging device; and
   updating the supply item, by the supply item, based on the time measurement of the imaging device.

8. The method of claim 7, wherein updating the supply item comprises changing functionality of the supply item.

9. The method of claim 8, further comprising:
   when the time measurement is updated, activating/deactivating and/or performing specified functions which are set to be activated/deactivated and/or performed at a time before the updated time measurement.

10. The method of claim 8, wherein the functionality is a security function, and changing the functionality comprises activating the security function.

11. The method of claim 7, wherein updating the supply item comprises changing a security key of the supply item.

12. The method of claim 11, wherein changing the security key comprises selecting a new security key from a plurality of stored security keys on the supply item.

13. An imaging system comprising an imaging device, the imaging device comprising a memory, the memory storing a time measurement, wherein the imaging device is configured to maintain the time measurement by:
   receiving a supply item manufacturing time stamp from a supply item connected to the imaging device, and
   updating the time measurement of the imaging device, based on the supply item manufacturing time stamp and an imaging device supply item, wherein the imaging device supply item is configured to be updated in a corresponding way to the imaging device.

* * * * *